July 18, 1967
G. O. MORRIS
3,331,256
SHAFT ADJUSTMENT MEANS
Filed Jan. 22, 1965
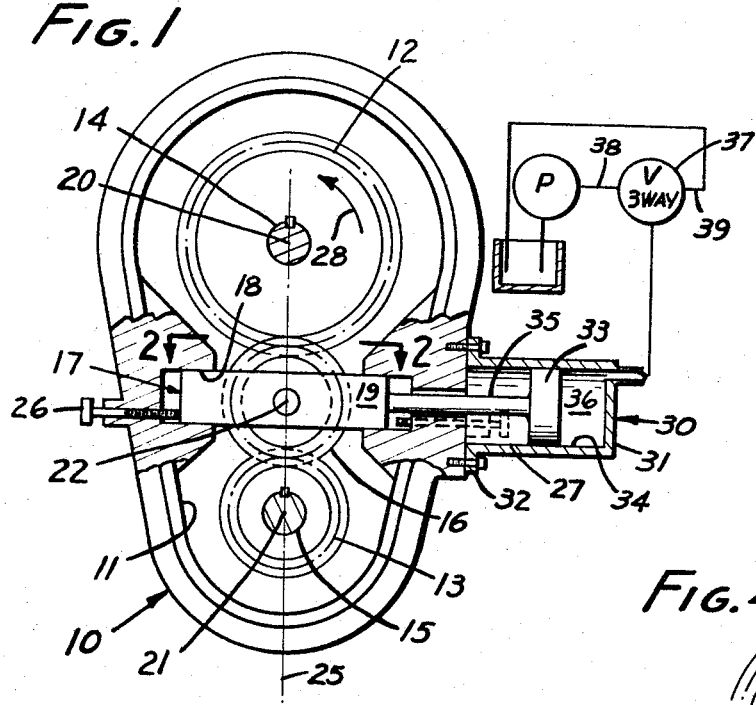
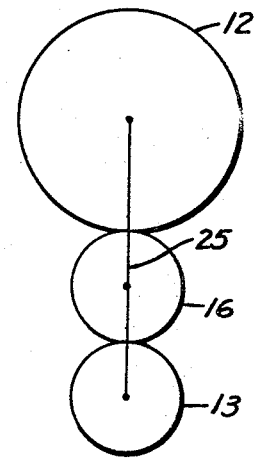
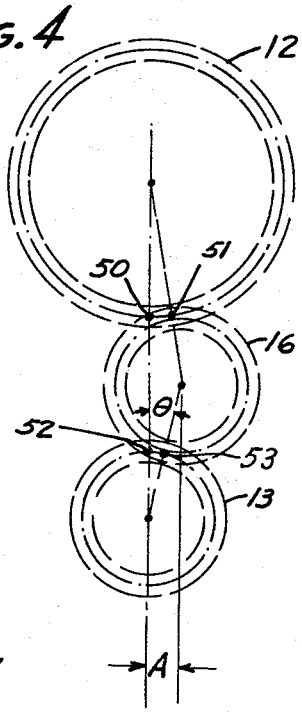
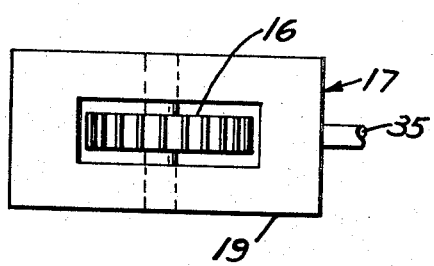
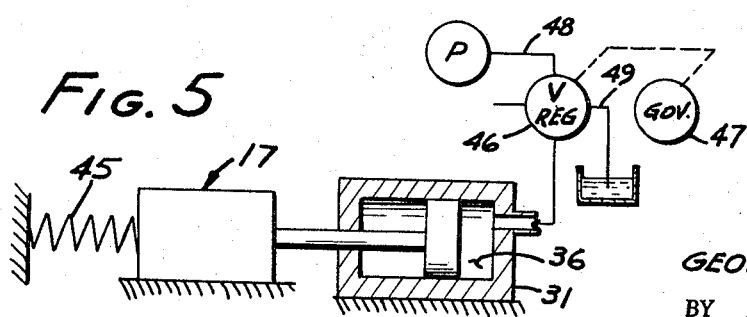
INVENTOR.
GEORGE O. MORRIS
BY
ATTORNEYS.

United States Patent Office 3,331,256
Patented July 18, 1967

3,331,256
SHAFT ADJUSTMENT MEANS
George O. Morris, 300 E. Pacific Coast Highway,
Bayside Village 117, Newport Beach, Calif.
Filed Jan. 22, 1965, Ser. No. 427,353
10 Claims. (Cl. 74—397)

This invention relates to means for adjusting the relative angular position between a first and a second gear and thereby between two shafts, such as the crankshaft and cam shaft of an automobile engine.

There are numerous examples where it is desirable to change the relative angular position between a pair of shafts. Such adjustable positioning is sometimes called "timing," and its necessity is noted in such diverse applications as rotary printing presses and internal combustion engines. Particularly in the latter, the timing of the valve cam shaft relative to the cam shaft ought to be a function of the engine speed. This is for the reason that inlet and outlet gas velocities need to be different at different speeds, and therefore require different valve settings, or at least a convenient adjustment to secure a compromise adjustment for anticipated speeds. Heretofore this has been accomplished by various means, but all previous means have required such complicated and often unreliable mechanisms as to be, in effect, commercially unsuitable. Such devices have not, in fact, been widely used commercially for this very reason.

It is an object of this invention to provide a simple device for adjusting the position of two gears (or shafts) relative to each other, which adjustment can be established manually by a one-time adjustment, or which may be adapted for continuous or even automatic adjustment in the course of engine operation.

A device according to this invention is used in combination with a first and a second gear which have between them a fixed line of centers. An intermediate gear is meshed with these two gears, all of the gears having a respective axis of rotation, these axes of rotation being parallel. Mounting means mount the intermediate gear for motion lateral to the line of centers, while still in mesh with both other gears. The intermediate gear thereby becomes part of a power train, but by virtue of its lateral motion, adjusts the relative angular positions of the first and second gears.

According to a preferred but optional feature of the invention, motive means is provided for shifting the intermediate gear which preferably comprises a slide and a ways for the slide under control of motor means.

The above and other features of this invention will be fully understood from the following detailed description and the accompanying drawings in which:

FIG. 1 is a side elevation partly in cutaway cross-section of the presently preferred embodiment of the invention;

FIG. 2 is a cross-section taken at line 2—2 of FIG. 1;

FIGS. 3 and 4 are schematic drawings showing portions of FIG. 1 in two operative positions; and FIG. 5 is a schematic illustration of still another control system for the embodiment of FIG. 1.

FIG. 1 shows an adaptor plate 10 adapted to be mounted to the motor block. For convenience in discussion, plate 10 will occasionally be called a block, because it is structurally integral therewith when bolted onto it by its flanges.

The plate includes a cavity 11 within which a first gear 12 and a second gear 13 are positioned. These gears are respectively pinned to a cam shaft 14 and to a drive shaft 15, and will customarily have a tooth ratio of 2:1 in a common internal combustion engine. These gears are pinned to their respective shafts by conventional means so as to project into the cavity, there to mesh with an intermediate gear 16.

Gear 16 is supported by mounting means 17, this mounting means comprising a ways 18 and a slide 19 in the ways. The three gears 12, 13, and 16 have axes of rotation 20, 21, 22, respectively, all of which are parallel to each other (normal to the drawing sheet). There is a line of centers 25 between the central axes of gears 12 and 13, this line of centers being fixed because the two shafts, and therefore the two gears, are fixed. The slide is adapted to move the intermediate gear laterally relative to the line of centers. A pair of stop screws 26, 27 limit the left and right-hand extent of motion as shown in FIG. 1. Arrow 28 indicates the direction of rotation of the gear 12 and this motion tends to bias the idler gear toward the right in FIG. 1.

Motive means 30 comprising motor means 31 is mounted at flange 32. The motor means is preferably a piston-cylinder combination wherein a piston 33 is fitted within a cylinder 34, the piston being extended as a rod 35 to engage the slide 19. The cylinder is attached to ways 18 through the adaptor plate. A fluid chamber 36 is formed to the right of the piston in FIG. 1 so that the pressure exerted therein will tend to move the slide to the left.

It will be noted in FIG. 2 that the intermediate gear is mounted in a cavity in the slide so as to project from both sides thereof. The gear ratio between the intermediate gear and the first and second gears is immaterial so long as the teeth are respectively engaged. The diameter of the intermediate teeth are respectively engaged. The diameter of the intermediate gear will have no effect on the ratio between that of the first and second gears.

Should it be desired to adjust the timing only by mechanical means, then the slide may be positioned by adjustment of the two top screws to trap the slide at the proper location.

Should power adjustment be desired, then both screws will be set to limit the respective extents of motion in FIG. 1. There will be a normal setting with the slide to the right at some pressure in chamber 36 below the valve needed to overcome the force of the gear torque, and a second setting determined by screw 26 when fluid force (such as engine oil under pressure) overcomes the torque effect of gear 12.

The simplest hydraulic control is shown in FIG. 1 which includes a three-way valve 37, which includes an inlet port 38 for engine oil under pressure, and a return port 39 to sump. This valve may be made sensitive to pressure or engine speed such as by a governor, or by constant delivery pump, so as to open and admit pressure to chamber 36 above a given pressure, and to vent chamber 36 to sump below that pressure.

A more sophisticated control is shown in FIG. 5, wherein a spring 45 is shown mounted between the adaptor plate and the slide so that pressure in chamber 36 will move the slide by a distance which is a function of the pressure therein, and thereby as a function of engine speed. A bleed-type pressure regulator 46 under control of a governor 47 may be utilized selectively to direct fluid under pressure from an inlet port 48 to chamber 36 or to a return port 49 as in the previous example, and to maintain the pressure at the desired setting. Then, as the engine speeds up for example, the regulator valve might increase the pressure in chamber 36, thereby progressively overcoming the return force of spring 45, and thereby setting the position of the slide at a continuously variable adjustment.

FIGS. 3 and 4 illustrate the operation of this device. In FIG. 3, the centers of all of the gears are aligned on a line of centers 25. In FIG. 4, the center of the intermediate gear has been laterally displaced by a dimension A, and the effect will be, assuming gear 12 held still for a moment, that the tangent point of contact between gears 12 and 16 will have moved from point 50 to point 51. At the same time, the point of contact between gears 13 and 16 will have moved from point 52 to point 53. Thus, gear 13 and shaft 21 will have turned through angle θ relative to shaft 14. Now when the shafts run, they will do so with a phase displacement θ. It will be evident that the lateral dimension A and angle θ are a direct function of one another.

Although it would seem at first glance that if a perfect mesh occurs in FIG. 3, when the line of centers are all aligned, there would be a deleterious effect in moving the lines of center as shown in FIG. 4, experience has shown that this is not the case when the angular adjustments are relatively small. Devices of this class have been run for many hours with little wear even on gears which have not been hardened. The contact is not optimum in some of the adjustment positions, but with adequate gear teeth, particularly with spur gears, the contact and transmission of power is quite satisfactory, the tooth loadings are within tolerance, and the resultant economies and improvements in performance are so great as fully to justify any increase on wear in these readily replaceable gears.

There is thus provided a means for relatively adjusting the angular positions of a pair of shafts, using no more than a simple motor, a slide, a ways and an intermediate gear, all of which are readily adaptable to existing engines, and which perform simply, effectively and reliably.

This invention is not to be limited by the embodiments shown in the drawings and described in the description which are given by way of example and not of limitation, but in accordance with the scope of the appended claims.

I claim:

1. Apparatus for adusting the relative angular position between a first and a second gear, said gears having a fixed line of centers, said apparatus comprising: an intermediate gear meshed with the first and second gears, each of said gears having a respective axis of rotation, all of said axes being parallel; mounting means mounting the intermediate gear for motion lateral to the line of centers comprising a slide and a ways, the intermediate gear being rotatably mounted to the slide, and the ways lying obliquely to the line of centers; and motive means for moving the slide in the ways comprising a fluid motor interlinking the slide and the ways.

2. Apparatus according to claim 1 in which the fluid motor comprises a motor including a piston member and a cylinder member, one of said members being connected to the slide, and the other to the ways.

3. Apparatus according to the claim 2 in which fluid pressure means is provided to exert pressure on the piston in said cylinder in order to shift the block.

4. Apparatus according to claim 3 in which the fluid pressure means includes a valve selectible to direct pressure to said cylinder, or to relieve said pressure.

5. Apparatus according to claim 3 in which the slide and motor are opposed by a spring, and in which said fluid pressure means includes a pressure regulator adapted to apply fluid to said cylinder at a variable pressure, thereby to establish slide position as a function of said pressure.

6. In combination: a block; a first gear and a second gear mounted to said block; an intermediate gear meshed to the first and second gears, each of said gears having a respective axis of rotation, all of said axes being parallel, and the first and second gears having a fixed line of centers; mounting means mounting the intermediate gear for motion lateral to the line of centers while retaining the three gears in mesh comprising a slide and a ways, the intermediate gear being rotatably mounted to the slide, and the ways lying obliquely to the line of centers; and motive means for moving the slide in the ways comprising a fluid motor interlinking the slide and the ways.

7. A combination according to claim 6 in which the fluid motor comprises a motor including a piston member and a cylinder member, one of said members being connected to the slide, and the other to the ways.

8. A combination according to claim 7 in which fluid pressure means is provided to exert pressure on the piston in said cylinder in order to shift the block.

9. A combination according to claim 8 in which the fluid pressure means includes a valve selectible to direct pressure to said cylinder, or to relieve said pressure.

10. A combination according to claim 8 in which the slide and motor are opposed by a spring, and in which said fluid pressure means includes a pressure regulator adapted to apply fluid to said cylinder at a variable pressure, thereby to establish a slide position as a function of said pressure.

References Cited

UNITED STATES PATENTS 3,175,415   3/1965   Belshaw _____ 74—397

FOREIGN PATENTS 815,919   11/1951   Germany.

DONLEY J. STOCKING, Primary Examiner.

DAVID J. WILLIAMOWSKY, LEONARD H. GERIN, Examiners.